US012570193B2

(12) United States Patent
Pöllinger et al.

(10) Patent No.: US 12,570,193 B2
(45) Date of Patent: Mar. 10, 2026

(54) VEHICLE SEAT WITH BACKREST MADE OF FRAME ELEMENT AND KNITTED FABRIC

(71) Applicant: GRAMMER Aktiengesellschaft, Ursensollen (DE)

(72) Inventors: Thomas Pöllinger, Regensburg (DE); Christopher Neidl, Schmidgaden (DE); Sebastian Wegmann, Regensburg (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 301 days.

(21) Appl. No.: 18/473,441

(22) Filed: Sep. 25, 2023

(65) Prior Publication Data

US 2024/0116418 A1 Apr. 11, 2024

(30) Foreign Application Priority Data

Oct. 6, 2022 (DE) ..................... 10 2022 125 859.9

(51) Int. Cl.
*B60N 2/60* (2006.01)
*A47C 7/28* (2006.01)
(Continued)

(52) U.S. Cl.
CPC ......... *B60N 2/6027* (2013.01); *B60N 2/6036* (2013.01); *B60N 2/609* (2013.01); (Continued)

(58) Field of Classification Search
CPC ......... A47C 31/02; A47C 31/023; A47C 7/46; A47C 7/462; A47C 7/425; A47C 7/28; (Continued)

(56) References Cited

U.S. PATENT DOCUMENTS 4,432,521 A * 2/1984 Douglas ................. A45C 11/04
297/218.4
5,013,089 A * 5/1991 Abu-Isa ............... B60N 2/7094
297/452.64
(Continued)

FOREIGN PATENT DOCUMENTS

DE 19627546 10/1997
DE 102019210221 1/2021
(Continued)

OTHER PUBLICATIONS

Official Action for Germany Patent Application No. 102022125859.9, dated May 7, 2024, 5 pages.
(Continued)

*Primary Examiner* — Syed A Islam
(74) *Attorney, Agent, or Firm* — Sheridan Ross P.C.

(57) ABSTRACT

The invention relates to a vehicle seat with a seat part and a backrest part, in which the backrest part has a frame element which encloses an inner surface, and comprises a knitted fabric arranged on the frame element, wherein the knitted fabric, at least in the region of the inner surface, is arranged to be free-swinging on the front side of the frame element and, at least in the region of the inner surface, an upholstery support element is arranged in or on the knitted fabric and is held exclusively by the said knitted fabric, wherein the knitted fabric, at least in the region of the inner surface, provides the sole support and/or upholstery for a seat user.

9 Claims, 18 Drawing Sheets

(51) Int. Cl.
  *A47C 7/46* (2006.01)
  *A47C 31/02* (2006.01)
(52) U.S. Cl.
  CPC ................. *A47C 7/28* (2013.01); *A47C 7/46*
  (2013.01); *A47C 31/02* (2013.01)
(58) Field of Classification Search
  CPC ...... A47C 7/021; B60N 2/7094; B60N 2/686;
  B60N 2/6027; B60N 2/5825; B60N 2/609
  See application file for complete search history.

(56) References Cited

U.S. PATENT DOCUMENTS

| | | | | |
|---|---|---|---|---|
| 5,729,846 A * | 3/1998 | Sullivan | ................. | A47G 9/062 |
| | | | | 5/923 |
| 10,182,658 B2 * | 1/2019 | Harkey | ................. | A47C 7/425 |

FOREIGN PATENT DOCUMENTS

| | | |
|---|---|---|
| EP | 3126187 | 7/2019 |
| JP | 2015-074338 | 4/2015 |
| JP | 2016-000551 | 1/2016 |
| WO | WO 98/19879 | 5/1998 |

OTHER PUBLICATIONS

Extended European Search Report (no English translation available) for Europe Patent Application No. 23193236.9, dated Feb. 1, 2024, 6 pages.
Official Action for Germany Patent Application No. 102022125859.9, dated Feb. 10, 2023, 10 pages.

* cited by examiner

VEHICLE SEAT WITH BACKREST MADE OF FRAME ELEMENT AND KNITTED FABRIC

CROSS REFERENCE TO RELATED APPLICATION

This application claims the benefit of German Patent Application No. 10 2022 125 859.9, filed Oct. 6, 2022, the contents of which are incorporated herein by reference in its entirety.

FIELD

The invention relates to a vehicle seat with a seat part and a backrest part, in which the backrest part has a frame element enclosing an inner surface and a knitted fabric arranged on the frame element. Furthermore, the invention relates to an interior device of a means of transport, in particular a means of passenger transport, with a vehicle seat.

BACKGROUND

Such vehicle seats are used, for example, in passenger transport means such as trains. Such means of transport are intended and suitable for transporting a number of people and are, for example, rail vehicles or aircraft. Corresponding rail vehicles are, for example, local and/or long-distance trains, suburban trains, underground trains and the like. The space available for and around the seat is often limited, especially in such means of transport. Therefore, there is a need to use the available space as optimally as possible. As many passengers as possible should be able to be accommodated in one means of transport. Furthermore, the weight and the costs of the vehicle seats play a decisive role, simply because of the large number in such means of transport, whereby these points in particular are a disadvantage with previous vehicle seats. The simple and quick replacement of wear parts, such as covers, is also particularly relevant, as the intensive use by a large number of passengers, but also vandalism, means that replacement of the covers must be expected at regular intervals, whereby this is usually time-consuming and cost-intensive with known vehicle seats.

SUMMARY

The object of the present invention is to provide a vehicle seat which overcomes the disadvantages mentioned above. Furthermore, it is the task of the invention to provide an interior decoration of a means of transport which overcomes the disadvantages mentioned above.

The object is solved by the vehicle seat having a seat part and a backrest part, wherein the backrest part comprises a frame element that encloses an inner surface, and comprises a knitted fabric disposed on the frame element and method of interior decoration of a means of transport, in particular a means of passenger transport.

The core idea of the invention is a vehicle seat with a seat part and a backrest part, in which the backrest part comprises a frame element enclosing an inner surface and a knitted fabric arranged on the frame element, the knitted fabric being arranged in a freely swinging manner on the front side of the frame element at least in the area of the inner surface and an upholstery support element being arranged in or on the knitted fabric and held exclusively by the said knitted fabric, at least in the area of the inner surface, the knitted fabric providing the sole support and/or upholstery for a seat user.

The term "substantially" as used herein is intended to be construed as including minor tolerance variations with respect to a feature.

The frame element includes an inner surface. According to the invention, an inner surface is understood to be a material-free or empty surface which is circumferentially limited by the enclosing frame element.

According to the invention, the knitted fabric represents a seat cover of the backrest, in particular a knitted fabric seat cover. Such a knitted fabric is advantageously produced with a knitting machine. This advantageous use of a knitted fabric allows a high variability in the design of the areas with different elasticities. Such knitted fabrics can advantageously have both flexible and rigid, or firm, sections. Compared to conventional woven fabrics, knitted fabrics can be produced very simply, cost-effectively and application-specifically.

A knitted fabric can be produced by certain yarns, wherein preferably the yarn has at least one of the following characteristics: maximum tensile strength at most 60 N, elongation at most 20% and material polyester or at least partly made of polyester.

It is also conceivable that different knitted fabrics are used, which can have different patterns.

The design of the backrest of the vehicle seat according to the invention with frame element and knitted fabric with upholstery support element ensures that no further elements for support and/or upholstery are necessary, at least in the area of the inner surface. In this way, costs, space and weight can be saved compared to conventional vehicle seats. Due to the free-swinging arrangement in the area of the inner surface, the knitted fabric can be stretched backwards into or beyond the inner surface when loaded by a seat user, so that upholstery and/or support can be provided. Advantageously, the seat cover is designed and intended to withstand the force applied by the seat user. The knitted fabric therefore advantageously has a corresponding stability. Accordingly, there are advantageously no further supporting or cushioning elements arranged in the inner surface. Preferably, the knitted fabric is arranged in the area of the inner surface in sections on or above and within the inner surface, wherein this is preferably also due to the construction of the upholstery support element and offers visual and ergonomic advantages.

Preferably, the vehicle seat described here is a railway seat, i.e. a seat for rail vehicles, such as local and/or long-distance trains, suburban trains, underground trains and the like.

According to a preferred embodiment, the upholstery support element is substantially planar. Preferably, the upholstery support element extends substantially parallel to the inner surface. Further preferably, the upholstery support element has a uniform thickness or a varying thickness. If the upholstery support element has a uniform thickness, fabrication and positioning on or in the knitted fabric is particularly easy. In the case of a varying thickness, an additional function can be imprinted on the upholstery support element, for example a structure particularly adapted to the back of a seat user. The thickness of the upholstery support element refers to an extension of the upholstery support element from front to back, i.e. in the installed state starting from the seat part towards the backrest part or vice versa. Particularly preferably, the upholstery support element has a convex lower segment curving forward towards the seat part and/or a convex middle segment curving backwards. Preferably, the lower segment has a uniform thickness across the entire width of the upholstery support element that narrows towards the top. Also preferably, the middle segment has a thickness that narrows outwardly relative to the width and height. Preferably, the upholstery support element has an upper segment with a uniform thickness. Preferably, the lower segment of the upholstery support element provides support for the lowest lordosis and the middle segment of the upholstery support element provides support for the upper lordosis. The above-described construction of the upholstery support element enables a comfortable sitting posture that is gentle on the back for a seat user, especially on longer journeys.

According to a preferred embodiment, the upholstery support element is attached to the knitted fabric on the rear side, i.e. on the side of the knitted fabric facing away from the seat part, in particular sewn on, or the knitted fabric is designed as a double-layer knitted fabric at least in the area of the inner surface and has a closable opening on the rear side, so that a pocket element is provided in the knitted fabric, into which the upholstery support element can be inserted via the opening in the knitted fabric. Preferably, the pocket element is designed to be complementary to the cushion support element. Particularly preferably, the dimensions of the pocket element are chosen to be smaller than the dimensions of the upholstery support element, so that the knitted fabric is stretched around the upholstery support element in the area of the pocket element when the upholstery support element is inserted. This ensures a secure hold and an improved appearance. Further preferably, the opening can be reversibly closed by means of a locking element, in particular a thread, a velcro fastener, a zip fastener or snaps. If the upholstery support element is attached to the rear side of the knitted fabric, it can be attached afterwards in a particularly simple and material-saving manner. In the embodiment with pocket element, a particularly positionally stable and secure arrangement of the upholstery support element within the knitted fabric is possible and the upholstery support element is thus protected from damage, for example when attaching or removing the knitted fabric from the frame element. The variants of the locking element mentioned here are not intended to be exhaustive, and further variants are conceivable. The decisive factor is the reversible non-destructive closability or opening of the opening in order to insert or remove the upholstery support element.

The above preferred embodiment of the upholstery support element and the knitted fabric makes it particularly easy to adapt the upholstery support element to the given dimensions of the seat and the required functionality, whereby the elasticity of the knitted fabric means that such an adaptation of the upholstery support element does not require any changes to the knitted fabric.

According to a preferred embodiment, the frame element has at least one fastening element on each of at least two opposite inner sides, and the knitted fabric has a fastening element complementary thereto and arranged on the rear side. Preferably, the knitted fabric is fastened to the frame element by the fastening elements in such a way that the knitted fabric at least partially embraces the frame element from the outside to the inside, starting from a front side of the frame element facing the seat part, and is substantially completely tensioned.

A complementary arrangement of the fastening elements of the frame element and the knitted fabric is understood to be such an arrangement that a permanent, in particular detachable, positive connection between the frame element and the knitted fabric is possible by means of the fastening elements. Furthermore, the complementary arrangement is understood to mean, in addition to the connectivity, the spatial arrangement of the fastening elements on the frame element and on the knitted fabric, according to which this enables a corresponding connection of the fastening elements with the intended fit of the knitted fabric on the frame element. The number of fastening elements on the frame element and on the knitted fabric is thus preferably identical, with a fastening element of complementary shape and spatial arrangement being present for each fastening element on the frame element, or vice versa.

According to a preferred embodiment, the frame element comprises a continuous upper area for supporting the head and a lower area having the inner surface for supporting the back. In contrast to the inner surface, the upper area is therefore continuous, i.e. not made of material, wherein a foam element can also be provided in this upper area for additional upholstery of the head. Preferably, one inner side of the upper area limits the inner surface from above and three inner sides of the lower area limit the inner surface laterally and from below. Further preferably, the frame element has at least one fastening element on each of the inner sides limiting the inner surface. Due to this arrangement of fastening elements, the knitted fabric is advantageously arranged in tension on the frame element. Preferably, the fastening elements on the frame element and the knitted fabric are designed in such a way that the fastening of the knitted fabric to the frame element can be released without being destroyed. Particularly preferably, the fastening between the frame element and the knitted fabric is a releasable positive connection.

Preferably, the fastening elements on the frame element are in the form of hooks, strips, Velcro fasteners, zip fasteners or snaps. Preferably, several different types of fastening elements or only one type of fastening element are provided. The fastening elements should not be limited to the types mentioned here. Preferably, the type or types of fastening elements are selected in accordance with the corresponding application. Advantageously, all types of fastening elements have in common that a releasable positive connection is ensured. Further preferred are several fastening elements or one continuous fastening element distributed over the length of the inner side of the frame element. In this way, a particularly stable fastening and also tensionability of the knitted fabric is ensured.

According to a preferred embodiment, the knitted fabric has an upper tubular section with two opening sides. Such tubular knitted fabrics can be regarded as opposing flat structures that are connected to each other at two outer borders. Advantageously, such a knitted fabric is produced using a 3D knitting process. Preferably, a first opening side is closed. In simplified terms, the upper section thus has the shape of a sock which can be put over very easily. Further preferably, the upper tubular section of the knitted fabric is arranged to enclose the upper area of the frame element. This design and arrangement of the upper section ensures easy positioning of the knitted fabric on the frame element before the hooping is carried out by fastening with the fastening elements. Preferably, the knitted fabric has a lower section which is substantially planar and directly adjacent to the upper section at the front. Particularly preferably, the lower section contacts the lower area of the frame element from the front and, starting from the front side of the frame element, at least partially embraces the lower area from the outside inwards. Preferably, the lower section is formed as a flat knitted fabric. A flat knitted fabric is a substantially flat structure which is surrounded by outer borders. This flat structure can have any shape, for example polygonal. If the thickness is neglected in the flat knitted fabric, an essentially two-dimensional flat structure can be assumed. In this way, the lower section can be easily adapted to the shape of the lower region of the frame element, so that an at least partially encompassing or encompassing attachment of the knitted fabric to the frame element is possible.

According to a preferred embodiment, the complementary fastening elements of the knitted fabric are arranged on the upper section at the rear border side at the open second opening side and on the lower section at the border side at the side and bottom. By arranging the fastening elements on the knitted fabric, the knitted fabric can be fastened to the fastening elements of all inner sides of the frame element limiting the inner surface. Preferably, the fastening element at the upper section is designed to run continuously along the length of the open second opening side. Preferably, the fastening elements on the lower section are designed as several fastening elements arranged along the length of the left, right and lower sides at the edge.

According to a preferred embodiment, the lower section of the knitted fabric, on or in which the upholstery support element is arranged, is convex towards the front in the direction of the seat part, at least in the area of the inner surface, so that a front convex area is formed, which from the front gives the appearance of an attached cushion. Due to this arrangement, a back of a seat user first comes into contact with the upholstery support element arranged in or on the knitted fabric, so that optimal upholstery and support is ensured.

According to a preferred embodiment, at least two, in particular at least four and particularly preferably six fastening units are fixedly arranged on the knitted fabric. Preferably, the fastening units comprise the fastening elements arranged on the knitted fabric and each fastening unit comprises at least one fastening element. Preferably, the fastening units are fastened to the border side of the knitted fabric, in particular opposite each other, in particular sewn on, and are formed in a strip-like manner. Further preferably, the fastening elements arranged on the fastening units project beyond a base surface of the knitted fabric. Preferably, the fastening units are made of a different material than the knitted fabric, in particular a rigid and tear-resistant material. In this way, the fastening units on the knitted fabric are not elastic and provide a firm hold for the fastening elements that are complementarily formed on the frame element. Further advantageously, the position and type of the respective fastening elements can be adapted to the existing conditions or designs of the frame element by subsequently attaching the fastening units and thus the fastening elements.

The object is also solved by an interior decoration of a means of transport, in particular a means of passenger transport, comprising at least one vehicle seat. The vehicle seat can have all the features already described above individually or in combination with each other and vice versa.

Further advantages, objectives and features of the present invention are explained with reference to the following description of the enclosed figures. Similar components may have the same reference signs in the various embodiments.

DETAILED DESCRIPTION

In the figures, identical components are to be understood with the corresponding reference signs. For the sake of clarity, some components may not be marked with a reference sign in some figures, but have been designated elsewhere.

Figure 1:
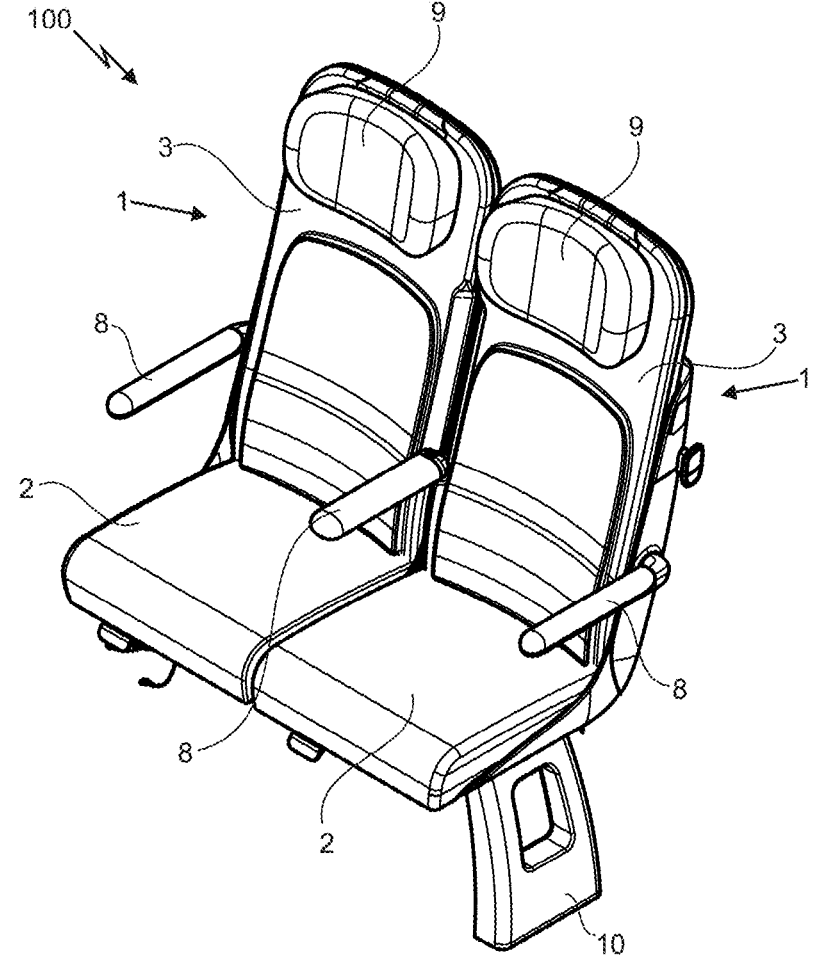
FIG. 1 a perspective view of an interior decoration according to one embodiment.

FIG. 1 shows a perspective view of an interior decoration of a means of transport, in this case a train or a railway, in the form of a double track seat comprising two vehicle seats according to the invention, which may have the essential features of the present application. Such an interior decoration 100 consists essentially of two vehicle seats 1 arranged side by side, each comprising a seat part 2, a backrest part 3, armrests 8, headrests 9 and a cantilever-type seat base 10.

Figure 2:
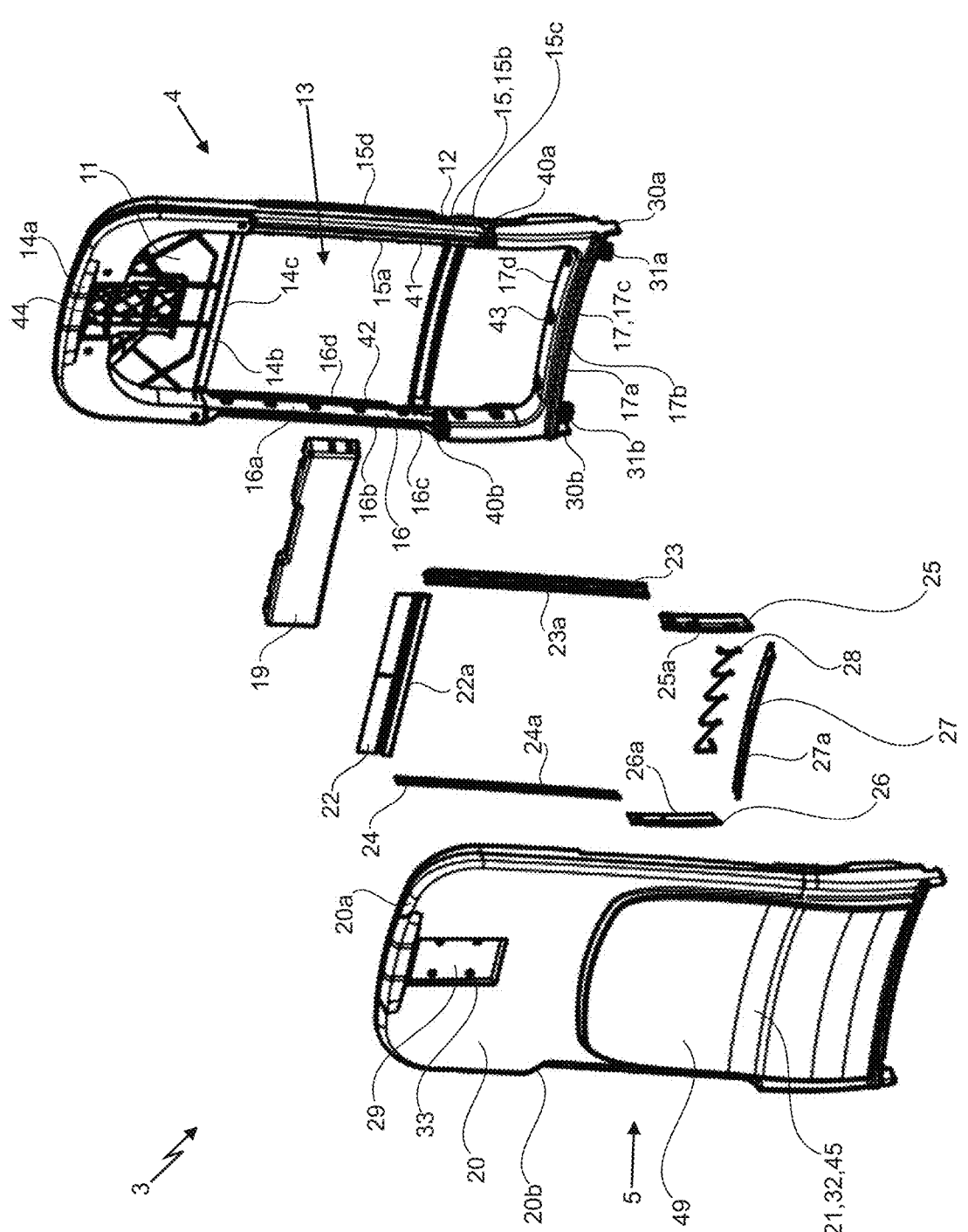
FIG. 2 an exploded view of a backrest part according to one embodiment.

In FIG. 2 the backrest part 3 of a vehicle seat 1 according to the invention is shown in an exploded view.

The backrest part 3 comprises a frame element 4 and a knitted fabric 5 detachably connected thereto, in particular in a form-fitting manner, or attached thereto.

The frame element 4 has an upper area 11 and a lower area 12 connected thereto. The upper area 11 together with the lower area 12 encloses an inner surface 13, wherein the inner surface 13 is exposed, i.e. no further elements of the frame element 4 are arranged there. The inner surface 13 is essentially rectangular.

The upper area 11 has an upper side 14a with two rounded corners and a cross member 14b with an inner side 14c, the cross member 14b or the inner side 14c closing off the upper area 11 downwards towards the inner surface 13. The upper area 11 further comprises a headrest fastening 44 to which the headrest 9 can be fastened.

Preferably, the headrest 9 is fastened to the frame element 4 by means of screws, so that the headrest fastening 44 has corresponding screw threads. Between the headrest attachment 44 and the cross member 14*b* is a substantially rectangular foam insert 19 which serves as upholstery or support for the shoulders.

The lower area 12 comprises a first side strut 15 with an inner surface 15*a* facing the inner surface 13, an outer side 15*b* facing the inner surface, a front side 15*c* facing the seat part 2 and an opposite rear side 15*d*. The lower area 12 comprises a second side strut 16 with an inner surface 16*a* facing the inner surface 13, an outer surface 16*b* facing the inner surface, a front surface 16*c* facing the seat part 2 and an opposite rear surface 16*d*. The lower area 12 comprises a cross member 17 with an inner surface 17*a* or top side 17*b* facing the inner surface 13, an outer surface 17*b* or bottom side 17*b* facing the inner surface, a front side 17*c* facing the seat part 2 and an opposite rear side 17*d*.

Several fastening elements 41 in the form of hooks are formed along the length of the inner side 15*a*, which project into the inner surface 13. Several fastening elements 42 in the form of hooks are formed along the length of the inner side 16*a*, which project into the inner surface 13. On the inner side 17*a*, several fastening elements 43 in the form of hooks are formed along the length thereof, which project into the inner surface 13.

On the outer side 17*b* or underside 17*b*, a seat foot connecting element 30*a*, 30*b* for connection to the seat foot 10 and a seat part connecting element 31*a*, 31*b* for connection to the seat part 2 are arranged laterally (left and right) in each case. The side struts 15, 16 each have a connecting axis 40*a*, 40*b*, so that the side struts 15, 16 are designed in two parts, so to speak. This has the advantage that the connected seat part 2 can be pushed backwards and forwards so that only the lower part of the side struts 15, 16 of the lower area 12 moves up to the connecting axes 40*a*, 40*b*. Furthermore, a support strut 18 is provided, which is connected to the rear sides 15*d*, 16*d* of the side struts 15, 16 and runs behind the inner surface 13. The support strut 18 has a stabilising effect.

The knitted fabric 5 has an upper section 20 and a lower section 21. The upper section is tubular with a closed upper opening side 20*a* and an open lower opening side 20*b*. The upper section 20 is slipped over the upper area 11 of the frame element 4 when closed. The upper section 20 also has a headrest recess 29 with circular recesses 33. In the area of the headrest recess 29 the headrest 9 is arranged, whereby the recesses 33 are intended for the passage of screws which are fastened in the headrest fastening 44 of the upper area 11.

The lower section 21 is essentially planar and directly adjoins the second opening side 20*b* of the upper section 20 at the front. In the attached state, the lower section 21 contacts the lower area 12 of the frame element 4 from the front. Starting from the front side of the frame element 4, the lower section 21 embraces or spans the lower area 12 at least partially from the outside inwards.

Furthermore, in the lower section 21 the knitted fabric 5 is formed as a double-layered knitted fabric 5 at least in the area of the inner surface 13 and has a closable opening 34 on the rear side, so that a pocket element 45 is provided in the knitted fabric 5, into which an upholstery support element 32 can be inserted via the opening 34 in the knitted fabric 5, the pocket element 45 being formed complementary to the upholstery support element 32. The upholstery support element 32 is arranged in the area of the inner surface 13 and is substantially flat and extends substantially parallel to the inner surface 13. The knitted fabric 5 and the upholstery support element 32 provide the only upholstery and/or support for a back of a seat user in the area of the inner surface 13, without other elements having to be arranged there or being necessary.

On the rear side of the knitted fabric 5 are an upper fastening unit 22 with a fastening element 22*a* which is continuous over the entire length, a first lateral fastening unit 23 with several fastening elements 23*a* distributed over the length, a second lateral fastening unit 24 with several fastening elements 24*a* distributed over the length, a third lateral fastening unit 25 with a plurality of fastening elements 25*a* distributed along the length, a fourth lateral fastening unit 26 with a plurality of fastening elements 26*a* distributed along the length and a lower fastening unit 27 with a plurality of fastening elements 27*a* distributed along the length. Details of the positions of the fastening units 22, 23, 24, 25, 26, 27 on the rear side of the knitted fabric are shown in connection with FIG. 3*b* below. The fastening elements 23*a*, 24*a*, 25*a*, 26*a*, 27*a* are formed as slot-like recesses which are complementary to the hook-shaped fastening elements 41, 42, 43, so that a releasable positive connection is ensured. The fastening element 22*a* is strip-shaped and can thus interact with the cross member 14*b* or the inner side 14*c* of the cross member 14*b* to form a releasable positive connection. Thus, the cross member 14*b* and the inner side 14*c* are themselves formed as fastening elements or can be referred to as fastening elements 14*b*, 14*c* of the frame element 4, the frame element 4 therefore also having this fastening element on the inner side 14*c*. The lateral fastening units 23, 24, 25, 26 are divided on the left and right respectively, i.e. into fastening units 23 and 25 and 24 and 26, since the side struts 15 and 16 of the frame element 4 are also divided by the connecting axes 40*a*, 40*b* and in this way the rotatability about the axis and the stable fastening are ensured.

Furthermore, a locking element 28 is shown, which is provided for releasably closing an opening 34 in the knitted fabric 5 (not shown here; see FIG. 3*b*) in a force-fitting manner.

Figure 3A:
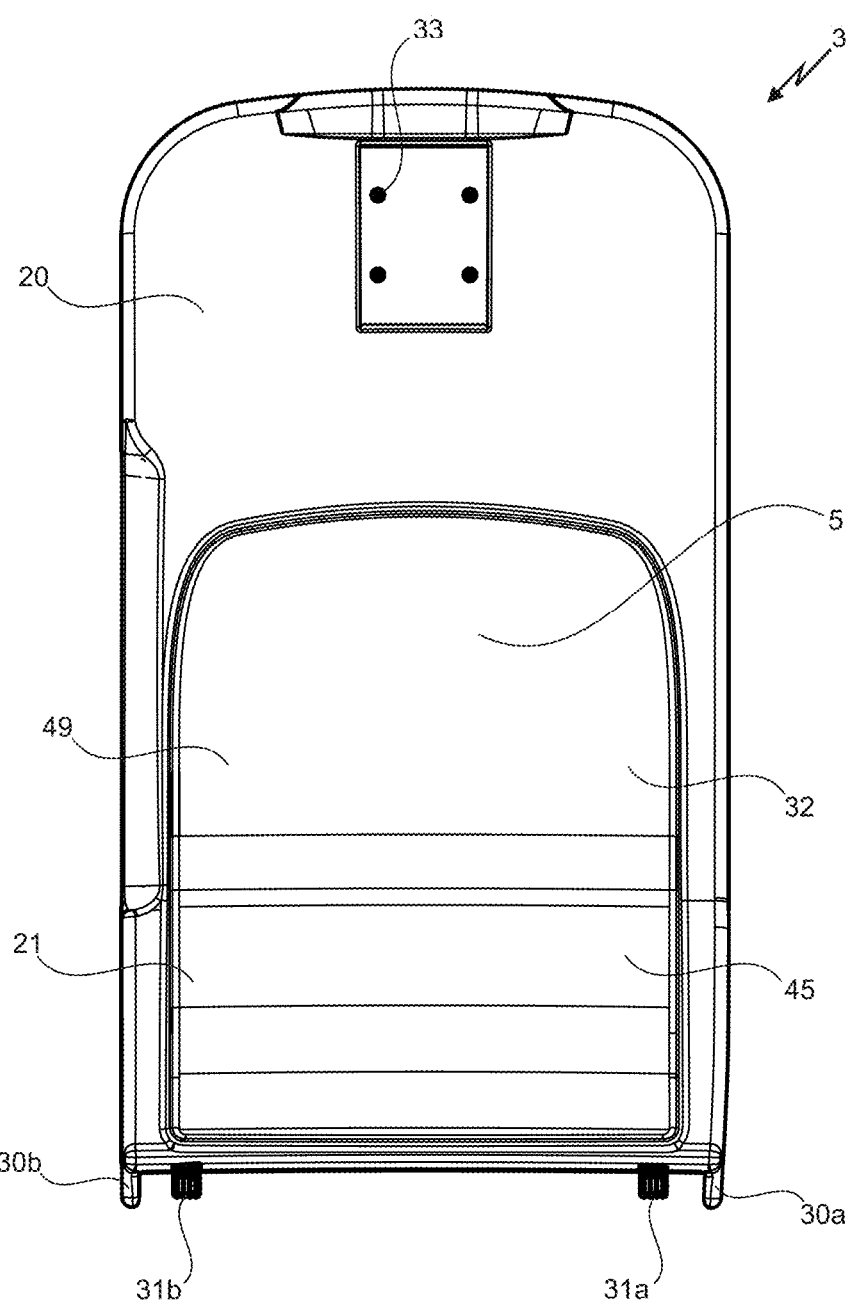
FIG. 3a a front view of a backrest part according to one embodiment.

FIG. 3*a* shows a front view of a backrest part 3. Here the knitted fabric 5 can be seen, with the upper section 20 and the lower section 21, which has the upholstery support element 32 arranged in the pocket element 45 within the knitted fabric 5. In the lower section 21 of the knitted fabric 5, in which the upholstery support element 32 is arranged, a front convex area 49 is formed at least in the inner surface area 13, which curves forward towards the seat part 2 and protrudes forward beyond the lower area 12 of the frame element 4, creating a cushion-like appearance so that it has the appearance of a pillow placed from the front. In the upper section 20, the four recesses 33 are arranged in a square or rectangular shape. Furthermore, the seat base connecting elements 30*a*, 30*b* arranged laterally on the outer side 17*b* or lower side 17*b* for connection to the seat base 10 and seat part connecting elements 31*a*, 31*b* for connection to the seat part 2 can be seen. The knitted fabric 5 is formed in such a way that the seat foot connecting elements 30*a*, 30*b* are each covered or stretched around on the outer side by the knitted fabric 5.

Figure 3B:
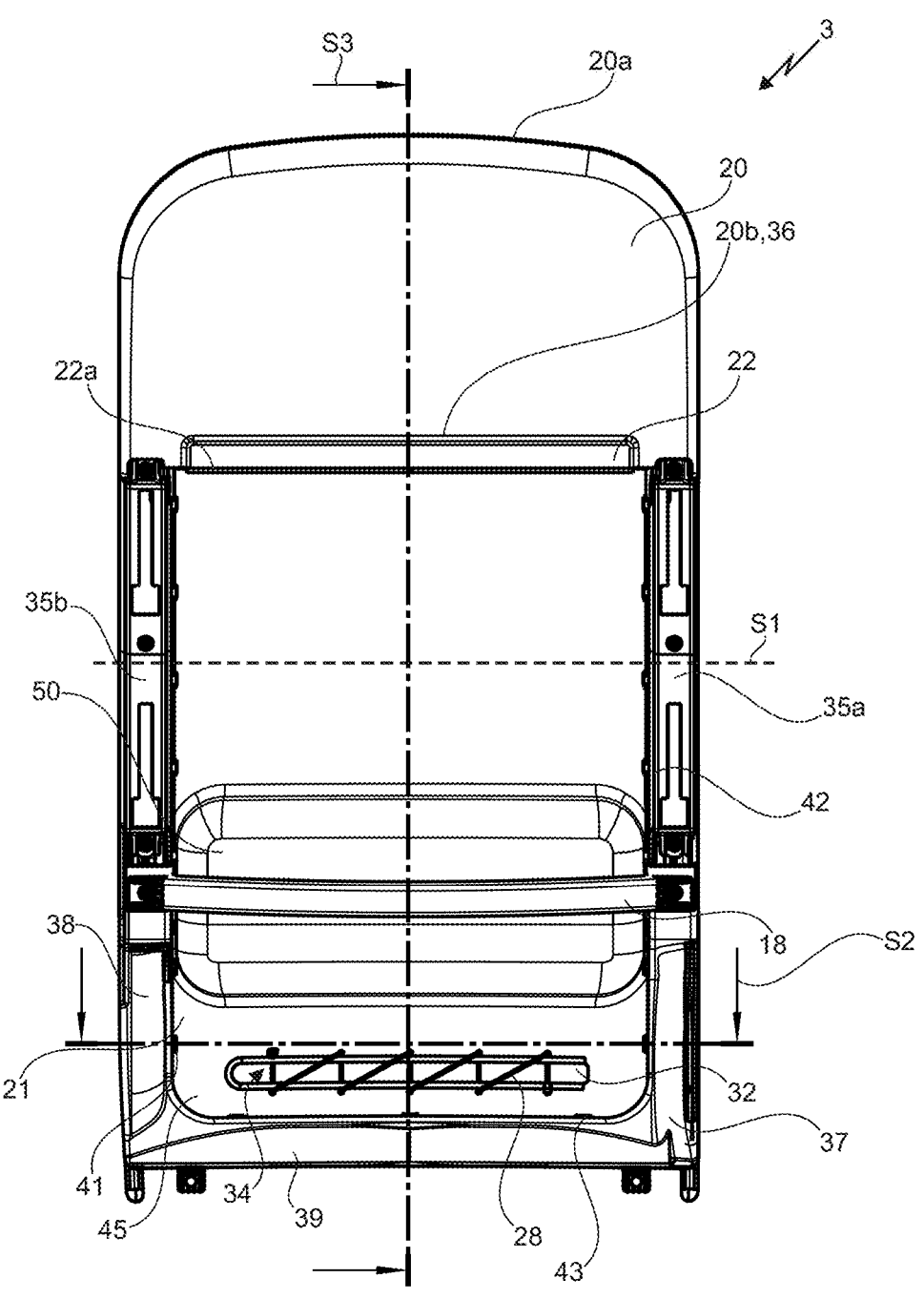
FIG. 3b a rear view of a backrest part according to one embodiment.

FIG. 3*b* shows a rear view of a backrest part 3. Here the upper tube-like section 20 of the knitted fabric is slipped over the upper area 11 of the frame element 4 and the fastening elements 22*a*, 23*a*, 24*a*, 25*a*, 26*a*, 27*a* on the fastening units 22, 23, 24, 25, 26, 27 of the knitted fabric are connected to the complementary fastening elements 14*b*, 14c, 41, 42, 43. The fastening units 22, 23, 24, 25, 26, 27 are each attached to the border side of the knitted fabric 5, in particular sewn on. The upper fastening unit 22 is arranged at an upper border area 36, which is formed at the second opening side 20b, and can thus be connected to the cross member 14b or inner side 14c of the cross member 14b as a fastening element. The first 23 and the third lateral fastening units 25 are arranged at a second lateral border area 38 of the knitted fabric 5. The second 24 and the fourth lateral fastening unit 26 are arranged at a first lateral border area 37 of the knitted fabric 5. The lower fastening unit 27 is arranged on a lower border area 39 of the knitted fabric 5. In the attached state, the lateral border areas 37, 38 of the knitted fabric 5 are arranged in such a way that they embrace or span the side struts 15, 16 of the frame element 4 from the front starting from the front sides 15c, 16c via the outer sides 15b, 16b and the rear sides 15d, 16d to the fastening elements 41, 42 on the inner sides 15a, 16a. In the attached state, the lower border area 39 of the frame element 5 is arranged in such a way that it embraces the cross member 17 of the frame element 4 from the front starting from the front side 17c via the outer sides or the underside 17b and the rear side 17d to the fastening elements 43 on the inner side or upper side 17a.

A mounting strip 35a, 35b is arranged on each of the side struts 15, 16 above the knitted fabric 5 or the lateral border areas 37, 38, which are preferably screwed to the rear side 15d, 16d. The mounting strips 35a, 35b are used for fastening the backrest part 3. The support strut 18 is also connected at the ends of the side struts 15, 16 above the knitted fabric 5 or the lateral border areas 37, 38, preferably screwed to the rear sides 15d, 16d.

In the lower section 21 of the knitted fabric 5, a rear convex area 50 is formed in the area of the inner surface 13, which curves backwards away from the seat part 2. The back convex area 50 is in the area of the support strut 18, so that when the knitted fabric 5 is loaded by a seat user and the resulting stretching of the knitted fabric 5 with an extension to the rear, the back convex area 50 contacts the support strut 18 and thereby further support of the upper lordosis is ensured.

Furthermore, the opening 34 in the form of a horizontal slot is shown on the rear side of the knitted fabric 5, via which the upholstery support element 32 can be inserted into the pocket element 45 in the lower section 21 of the knitted fabric 5, which is at least partially double-layered there. The opening 34 is releasably and positively closed by the cord-like locking element 28, so that the upholstery support element 32 cannot fall out of the pocket element 45 unintentionally.

Figure 4A:
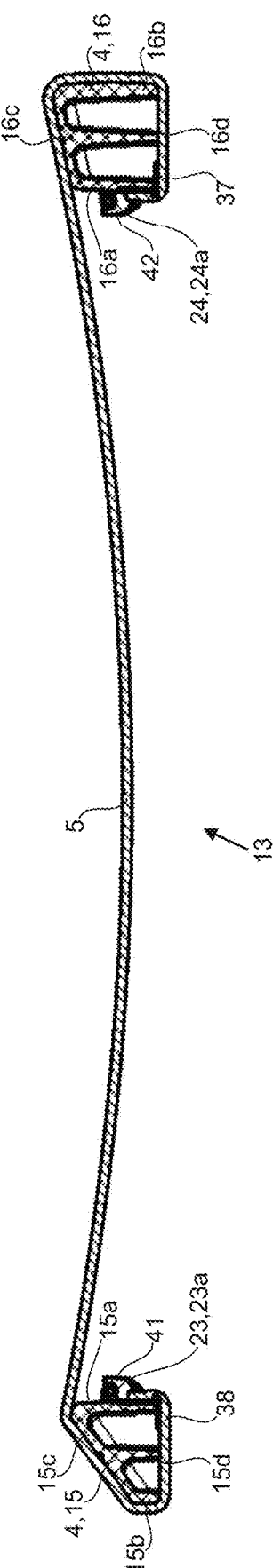
FIG. 4a a sectional view along section S1 of FIG. 3b of a backrest part according to an embodiment.
Figure 4B:
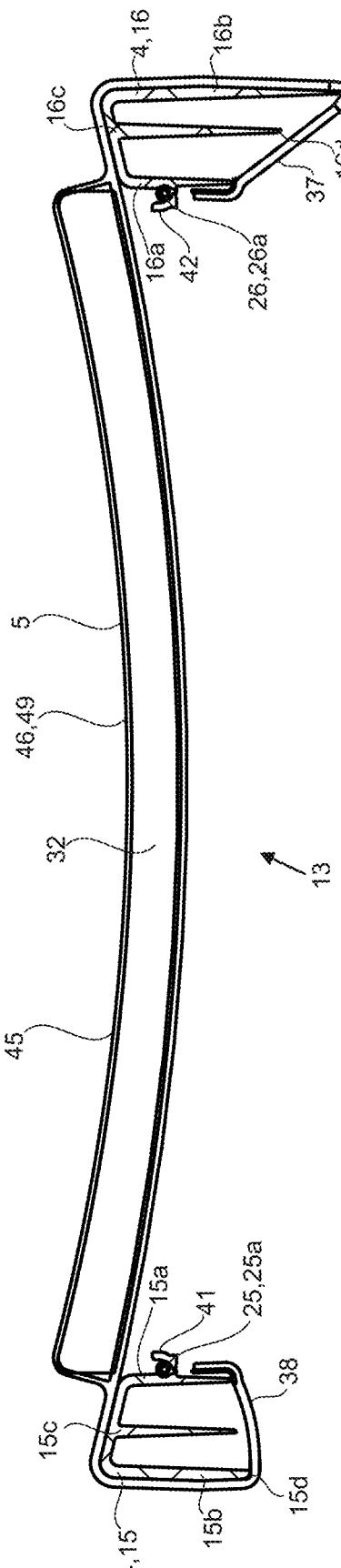
FIG. 4b a sectional view along section S2 from FIG. 3b of an inner backrest part according to an embodiment.
Figure 4C:
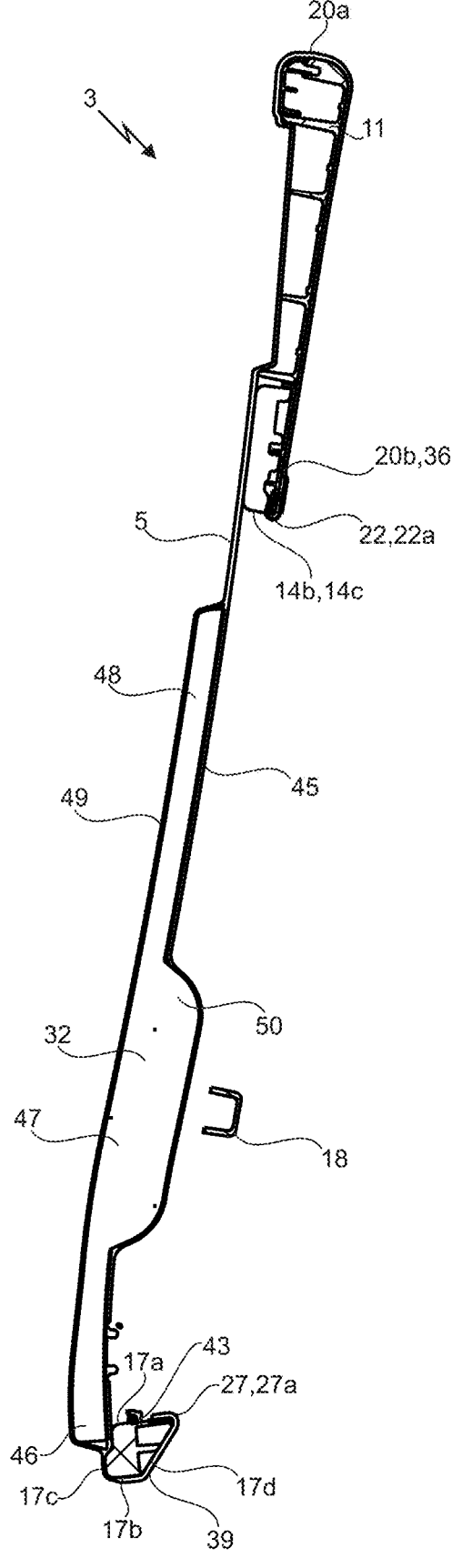
FIG. 4c a sectional view along section S3 from FIG. 3b of an inner back part according to an embodiment.

FIG. 3b also shows three cutting axes S1, S2, S3 indicating the cuts through the backrest part 3 shown in FIGS. 4a-4c.

Figure 3C:
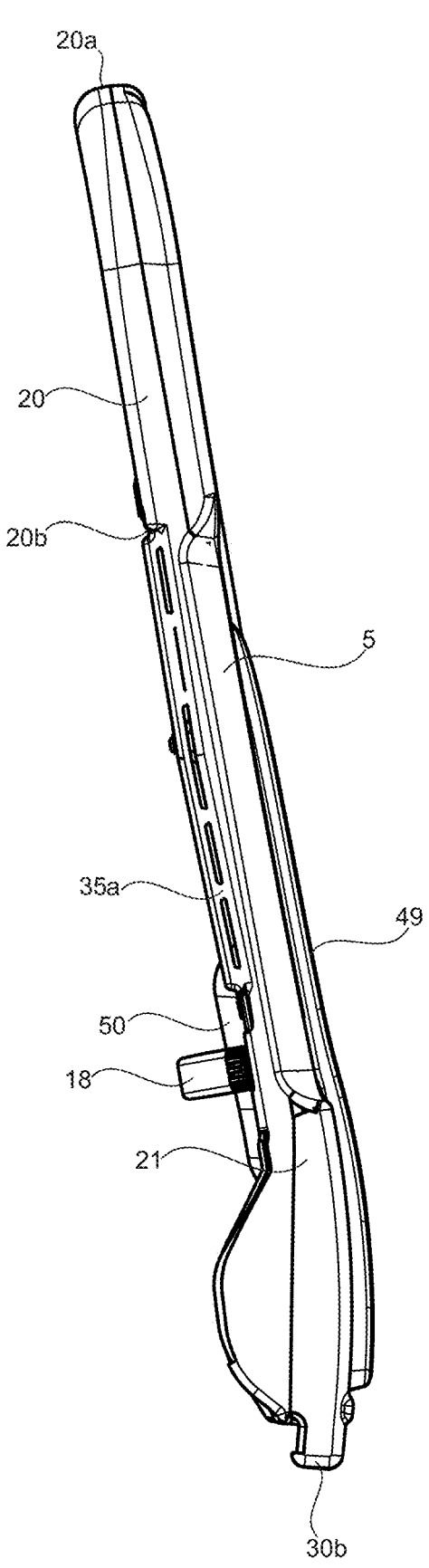
FIG. 3c a side view of a backrest part according to one embodiment.

FIG. 3c shows a side view of the backrest part 3 according to the embodiment of FIGS. 3a and 3b. In this illustration, the front convex area 49 and the rear convex area 50 can be seen.

FIGS. 4a, 4b, 4c each show a sectional view of a backrest part 3 along the cutting axes S1, S2, S3 as shown in FIG. 3b.

In FIG. 4a, the sectional view is shown along the cutting axis S1, whereby the backrest part 3 or the knitted fabric 5 is shown according to an embodiment which does not have an upholstery support element 32, but is only formed as a single layer. It can be seen how the knitted fabric 5 or the lateral border areas 37, 38 of the knitted fabric 5 embrace or span the side struts 15, 16 of the frame element 4 from the front, starting from the front sides 15c, 16c, via the outer sides 15b, 16b and the rear sides 15d, 16d to the fastening elements 41, 42 on the inner sides 15a, 16a. The lower border area 39 is arranged in a similar way to the lateral border areas 37, 38. Essentially, the knitted fabric 5 or the border areas 37, 38, 39 are each deflected by 90°. The knitted fabric 5 is arranged to swing freely in the area of the inner surface 13. In this section shown, the knitted fabric 5 extends on or over the inner surface 13.

The side struts 15, 16 are formed with recesses. This makes it possible to use a small amount of material and thus reduce the weight. The front side 15c of the first side strut 15 slopes downwards from the inner side 15a to the outer side 15b, i.e. the inner side 15a is longer than the outer side 15b. The front side 16c of the second side strut 16 starts from the outer side 16b and slopes downwards towards the inner side 16a, i.e. the outer side 16b is longer than the inner side 16a.

In FIG. 4b the section along the cutting axis S2 is shown, whereby the backrest part 3 or the knitted fabric 5 is shown according to an embodiment which has an upholstery support element 32, and is also designed with double layers at least in the region of the inner surface 13.

In the region of the inner surface 13, the upholstery support element 32 can be seen within the double-layered knitted fabric 5 forming the front convex area 49, which curves forwards towards the seat part 2 and projects beyond the frame element 4. In this section shown, the knitted fabric 5 extends on or over the inner surface 13.

The further embodiments shown in FIG. 4b correspond mutatis mutandis to the features described above in FIG. 4a.

In FIG. 4c, the section along the cutting axis S3 is shown, whereby the backrest part 3 or the knitted fabric 5 is shown according to an embodiment which has an upholstery support element 32, and is also designed with double layers at least in the area of the inner surface 13.

In the sectional view of FIG. 4c, the looping of the frame element 4 with the knitted fabric can be seen particularly well. The upper fastening unit 22 is arranged on an upper border area 36, which is formed on the second opening side 20b, and is thus positively connected to the cross member 14b or inner side 14c of the cross member 14b as a fastening element. The lower fastening unit 27 is arranged at the lower border area 39 of the knitted fabric 5 and comprises the fastening elements 27a, which are positively connected to the fastening elements 43 at the inner side 17a of the cross member 17. In the attached state, the lower border area 39 of the knitted fabric 5 is arranged in such a way that it embraces or spans the cross member 17 of the frame element 4 from the front starting from the front side 17c via the outer sides or the bottom side 17b and the rear side 17d to the fastening elements 43 on the inner side or top side 17a.

Furthermore, the upholstery support element 32 can be seen within the double-layer knitted fabric 5, which is arranged in the area of the inner surface 13. The front convex area 49 can be seen, which is formed by the entire upholstery support element 32 (all segments 46, 47, 48; see FIG. 7a-7c) in the knitted fabric 5. The rear convex area 50 is formed only in sections (through the middle segment 47; see FIGS. 7a-7c), and the rear convex area 50 is located within the inner surface 13 and may also partially overhang it to the rear. The rear convex area 50 or the middle segment 47 of the upholstery support element 32 are arranged at the same height so that contact is possible. A lower segment 46 of the upholstery support element 32 shows a convex curvature towards the front in the direction of the seat part 2 (see FIGS. 7a-7c).

Figure 5A:
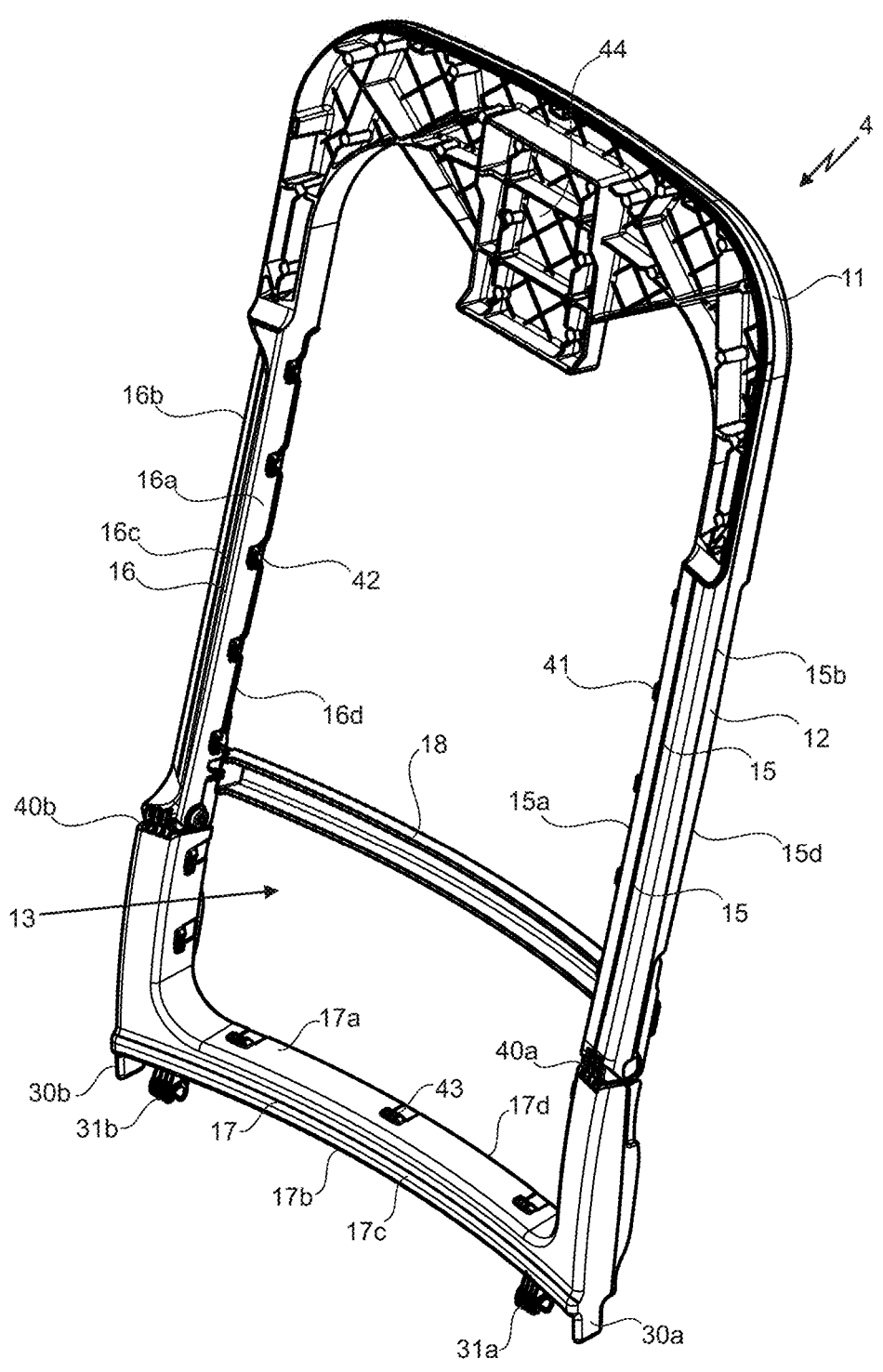
FIG. 5a a perspective view of a frame element according to one embodiment.
Figure 5B:
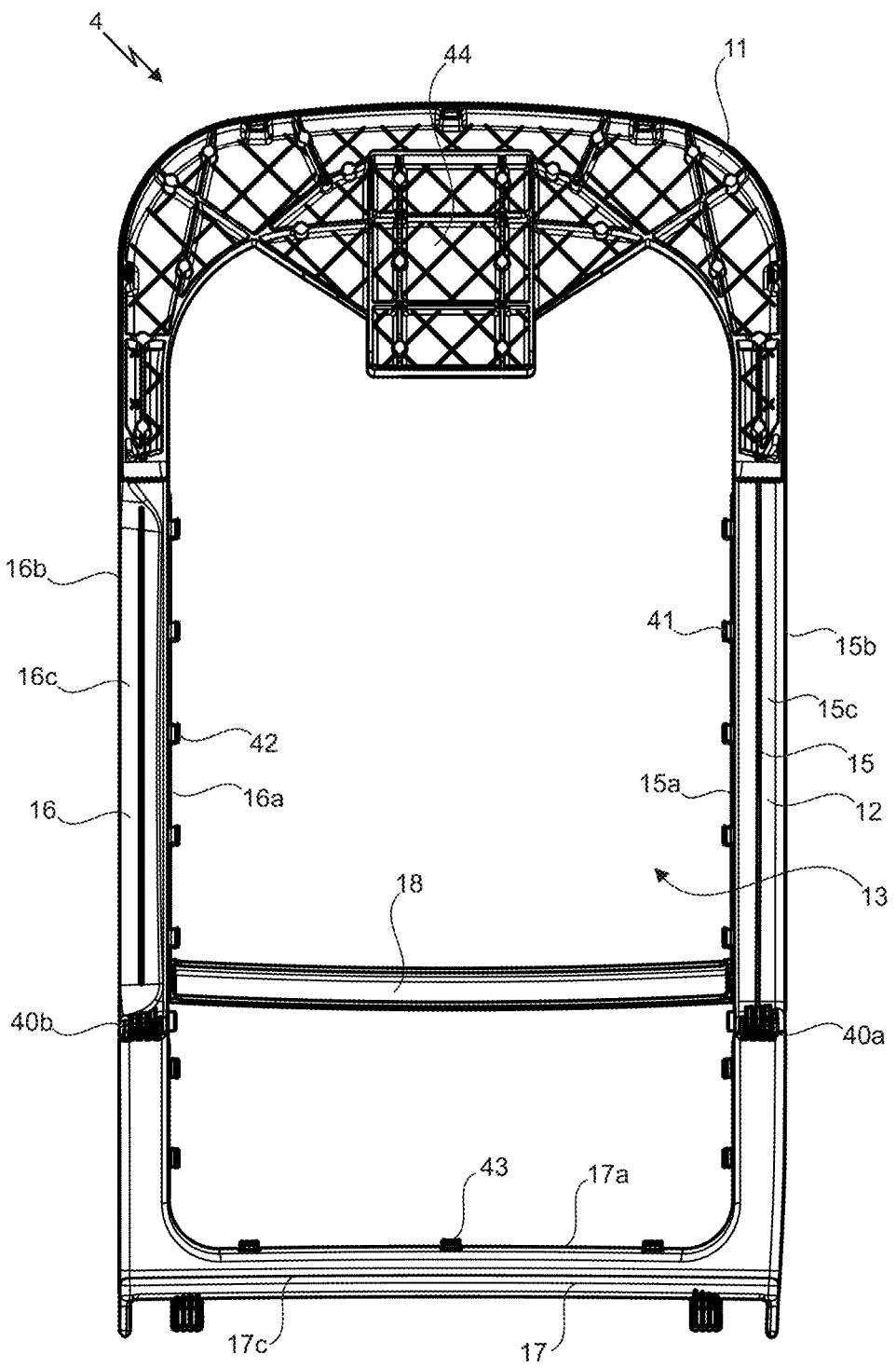
FIG. 5b a front view of a frame element according to one embodiment.
Figure 5C:
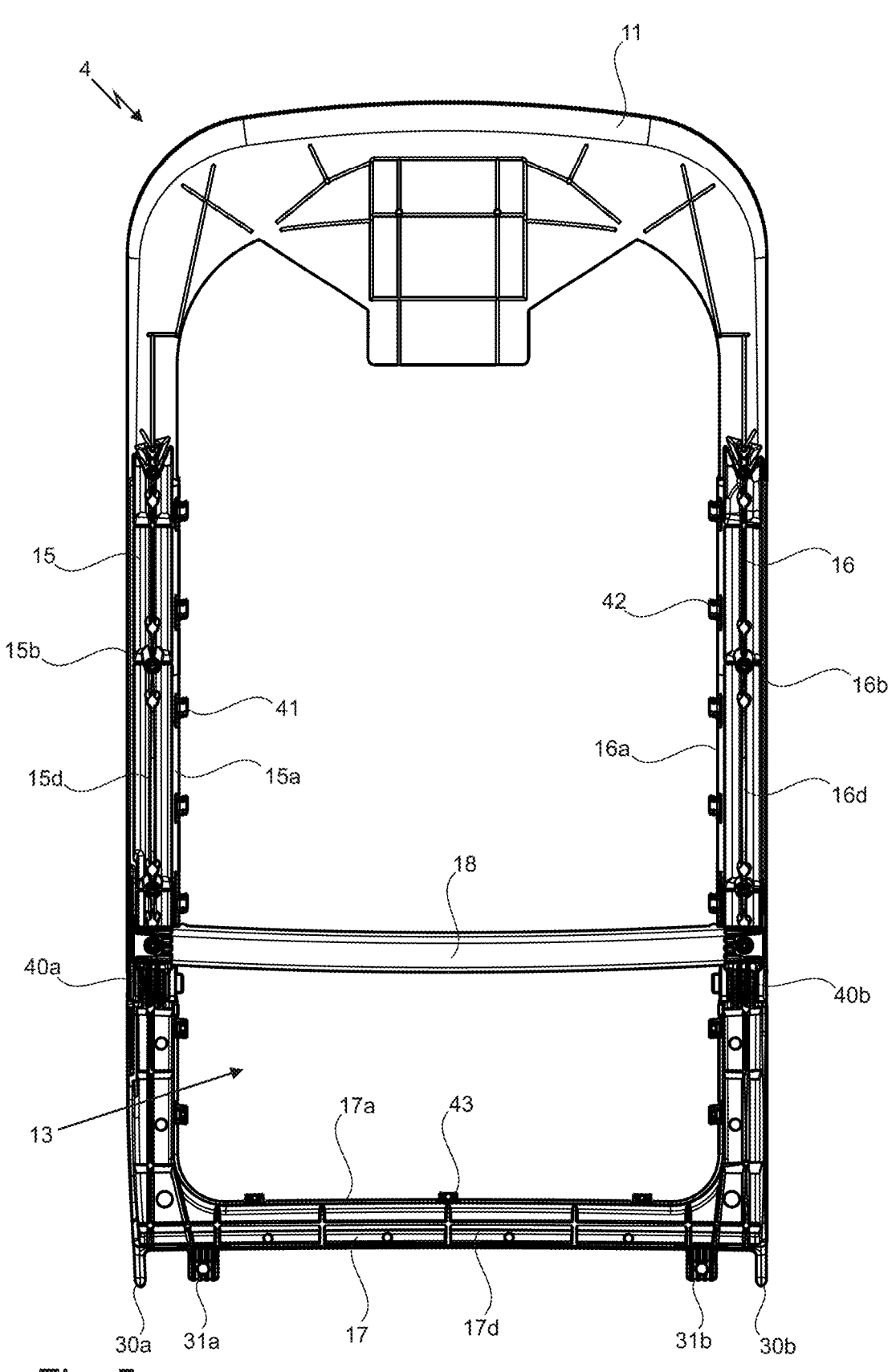
FIG. 5c a rear view of a frame element according to one embodiment.
Figure 5D:
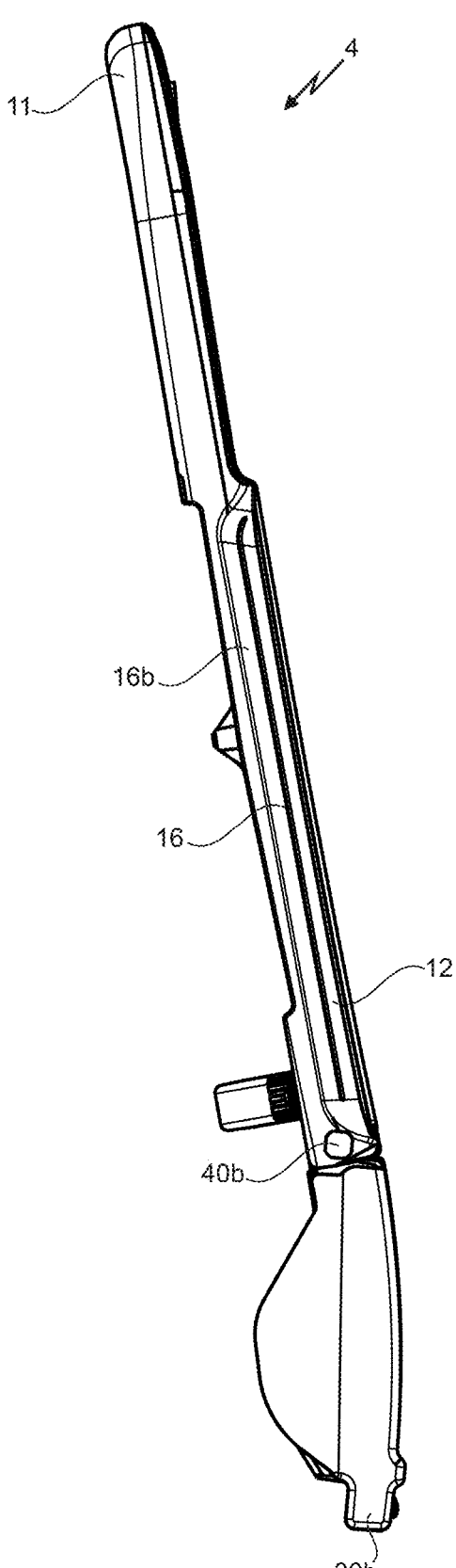
FIG. 5d a side view of a frame element according to one embodiment.

FIGS. 5a, 5b, 5c, 5d each show a view of a frame element 4, with FIG. 5a showing a perspective view, FIG. 5b a front view, FIG. 5c a rear view and FIG. 5d a side view.

The upper area 11 of the frame element 4 in FIGS. 5a-5d is only partially shown with the headrest fastening 44 for clarity, but not with the cross member 14b as shown in the exploded view in FIG. 2.

The inner sides 15a, 16a, 17a of the first side strut 15, the second side strut 16 and the cross member 17 are shown with fastening elements 41, 42, 43 in the form of hooks. The hook-shaped fastening elements 41, 42, 43 project from the inner surfaces 15a, 16a, 17a into the inner surface 13 and point forwards in the direction of the seat part 2, so that the complementary fastening elements 23a, 24a, 25a, 26a of the knitted fabric 5 can be hooked in accordingly. The fastening elements 41, 42, 43 are arranged along the entire length of the first side strut 15, the second side strut 16 and the cross member 17 on the inner sides 15a, 16a, 17a, wherein several individual fastening elements 41, 42, 43 are provided.

The side struts 15, 16 each have the connecting axis 40a, 40b, so that the side struts 15, 16 are formed in two parts, so to speak. This has the advantage that the connected seat part 2 can be pushed back and forth and thus only the lower part of the side struts 15, 16 of the lower area 12 moves up to the connecting axes 40a, 40b. Furthermore, the support strut 18 is arranged, which is connected to the rear sides 15d, 16d of the side struts 15, 16 at each end and runs behind the inner surface 13. The supporting strut 18 has a stabilising effect and an additional supporting function in cooperation with the back convex area 50 or the middle segment 47.

Figure 6A:
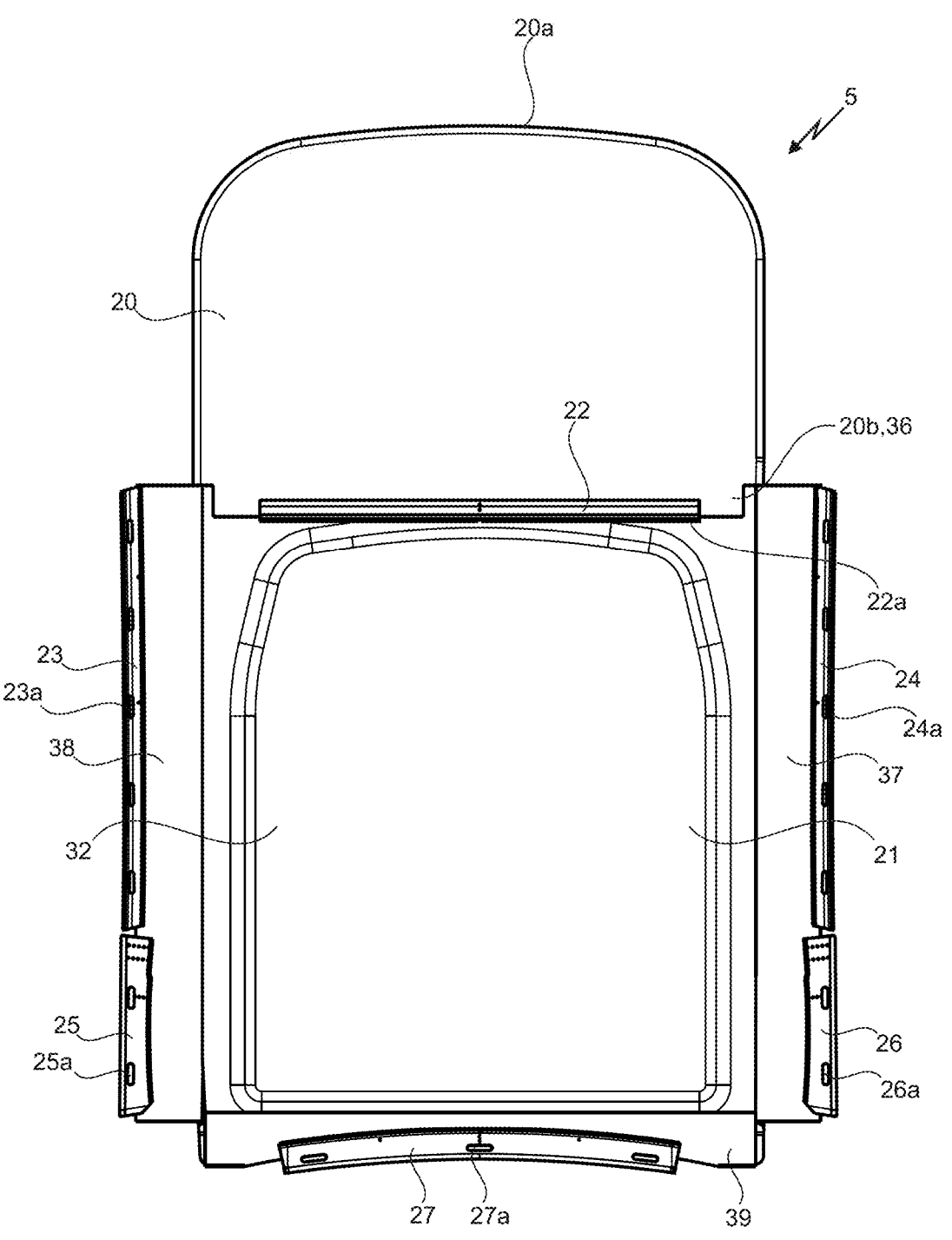
FIG. 6a a rear view of a knitted fabric according to one embodiment.
Figure 6B:
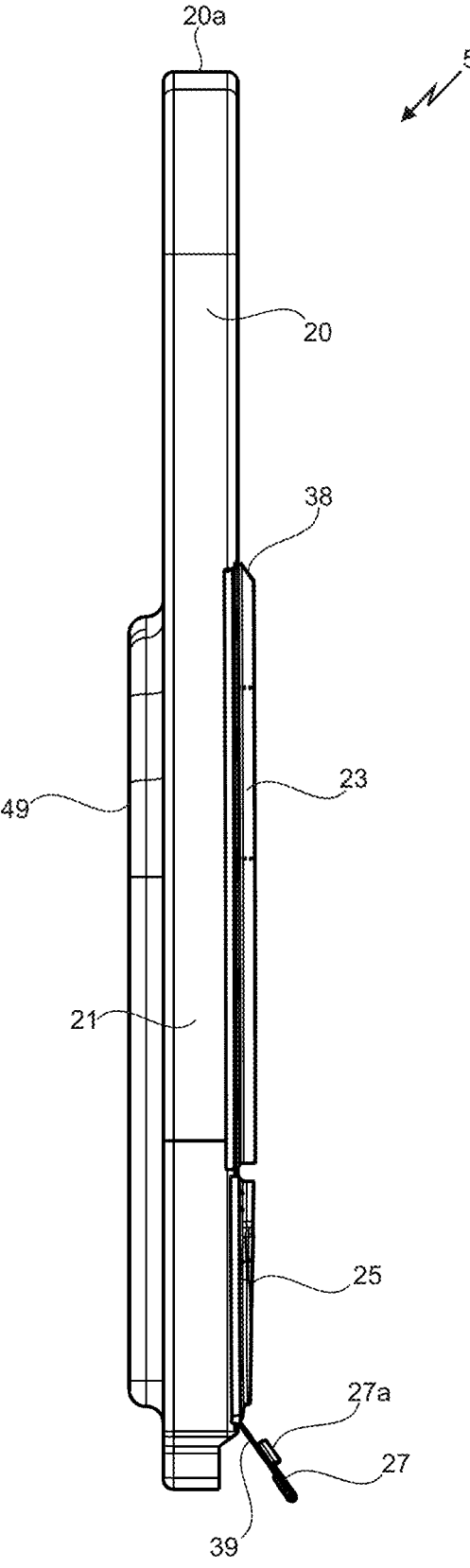
FIG. 6b a side view of a knitted fabric according to one embodiment.

FIGS. 6a and 6b show a knitted fabric 5 according to one embodiment in an unmounted state, so that only the knitted fabric 5 can be seen before the frame element 4 is hooped.

FIG. 6a shows a rear view of the knitted fabric 5 in a spread-out state. The knitted fabric has the upper tube-like section 20 with the two opening sides 20a, 20b, the first opening side 20a being closed and the substantially flat and further has the lower section 21 directly adjoining the upper section 20 at the front.

The fastening units 22, 23, 24, 25, 26, 27 are each attached to the border side of the knitted fabric 5, in particular sewn on. The upper fastening unit 22 is arranged at the upper border area 36, which is formed at the second opening side 20b. The first 23 and the third lateral fastening units 25 are arranged at the first lateral border area 38 of the knitted fabric 5. The second 24 and the fourth lateral fastening units 26 are arranged on a second lateral border area 37 of the knitted fabric 5. The lower fastening unit 27 is arranged at the lower border area 39 of the knitted fabric 5.

The fastening units 22, 23, 24, 25, 26, 27 have fastening elements 22a, 23a, 24a, 25a, 26a, 27a arranged on the knitted fabric. The fastening units 22, 23, 24, 25, 26, 27 are formed in a strip-like manner, wherein the fastening elements 22a, 23a, 24a, 25a, 26a, 27a arranged on the fastening units 22, 23, 24, 25, 26, 27 project beyond a base surface of the knitted fabric 5. The fastening element 22a on the upper fastening unit 22 is strip-like. The fastening elements 23a, 24a, 25a, 26a, 27a are shaped like holes so that they can be positively connected to the complementary hook-shaped fastening elements 41, 42, 43 of the frame element 4. The fastening units 23 and 24 and the fastening units 25 and 26 are arranged opposite each other on the knitted fabric 5. The edge areas 37, 38, 39 are wing-like so that they can be easily folded around the struts 15, 16, 17 for retensioning the frame element 4.

FIG. 6b shows a side view of the knitted fabric 5. From this view, the front convex area 49 can be seen, which curves out towards the seat part 2 and stands out from the rest of the knitted fabric 5 towards the front. The upholstery support element 32 stabilises or fills the area 49.

Figure 7A:
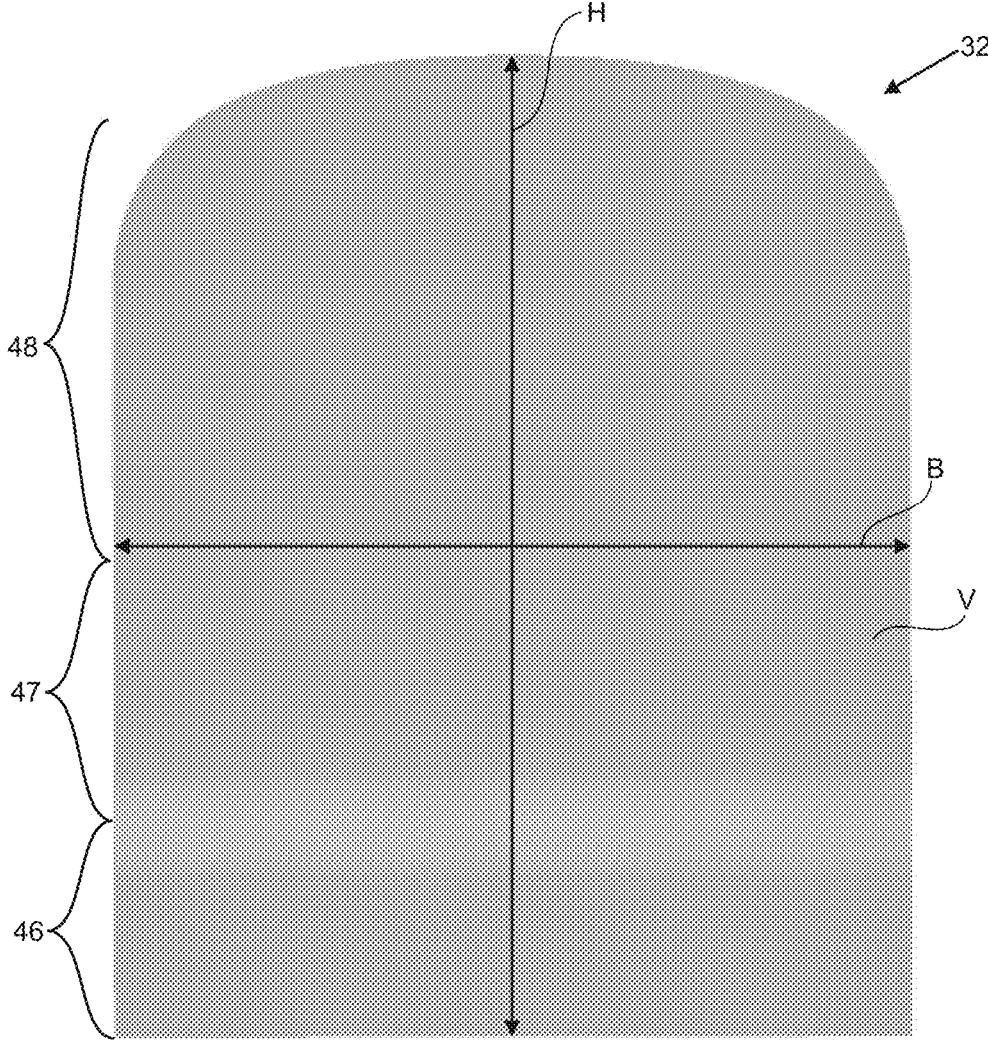
FIGS. 7a-c different views of an upholstery support element according to an embodiment.
Figure 7B:
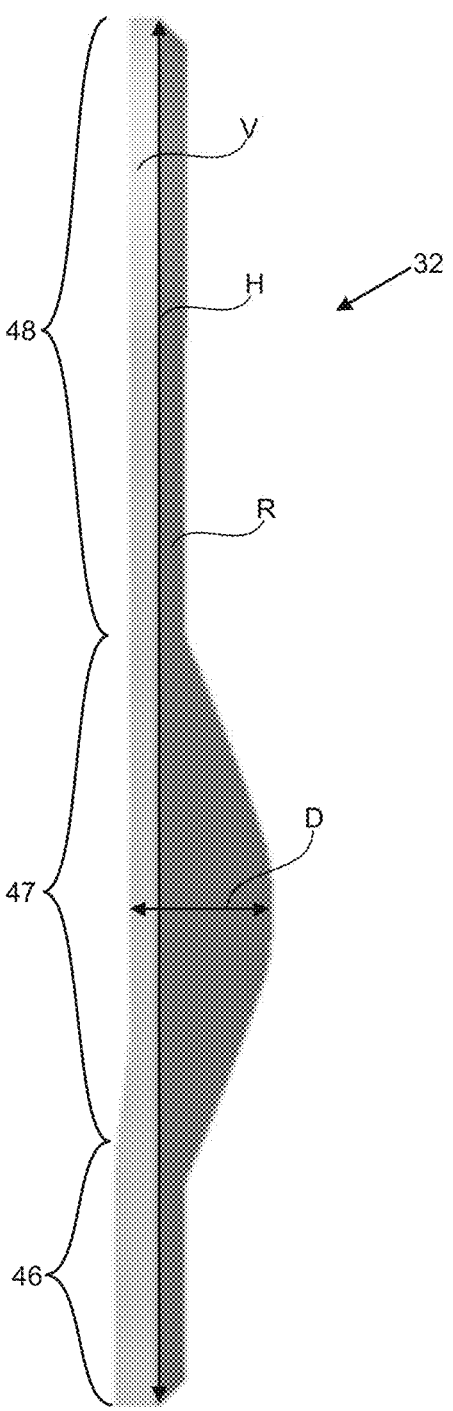
Figure 7C:
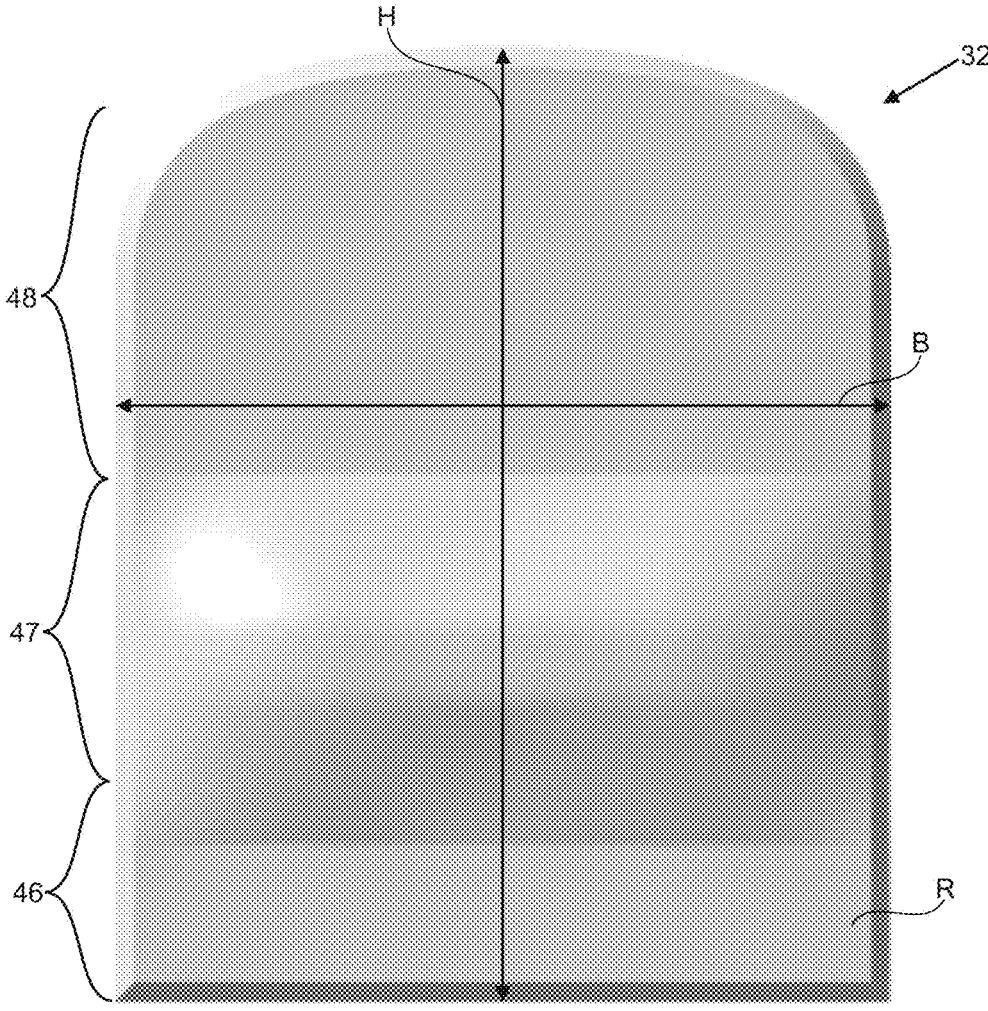

In FIGS. 7a, 7b and 7c an upholstery support element 32 is shown in various views. The upholstery support element 32 has a height H, a width B and a thickness D (the thickness can also be referred to as depth).

In FIG. 7a, the upholstery support element 32 is shown from the front. The front side V of the upholstery support element 32 faces forwards in the direction of the seat part 2 in the installed or fitted state in the knitted fabric 5.

In FIG. 7b the upholstery support element 32 is shown from the side. The thickness D of the cushion support element 32 can be seen here.

In FIG. 7c the upholstery support element 32 is shown from the rear. The rear side R of the cushion support element 32 points to the rear in the installed or fitted state in the knitted fabric 5.

The upholstery support element 32 has a lower segment 46, a middle segment 47 and an upper segment 48, the segments 46, 47, 48 being arranged in said row from the bottom to the top with respect to the height H of the upholstery support element 32.

Segments 46, 47, 48 form the front convex area 49 of the knitted fabric 5. The middle segment 47 forms the back convex area 50 of the knitted fabric.

As can be seen in particular in FIGS. 7b and 7c, the upholstery support element 32 has a varying thickness D over the height H and also the width B. The lower segment 46 is convex and curves forward towards the seat part 2. The middle segment 47 is also convex but curves backwards. The lower segment 46 has a uniform thickness D over the entire width B of the upholstery support element 32, which narrows, i.e. decreases, in height H towards the top. The middle segment 47 has a thickness D that narrows outwardly with respect to the width B and the height H, i.e., the middle segment 47 has the greatest thickness D in the middle that decreases in height H and width B. The upper segment 48 has a uniform thickness D. By the shown embodiment of the upholstery support element 32, the lower segment 46 ensures a support of the lower lordosis and the middle segment 47 ensures a support of the upper lordosis.

The upholstery support element 32 is essentially rectangular, with the upper corners, relative to the height H, being rounded.

Figure 8:
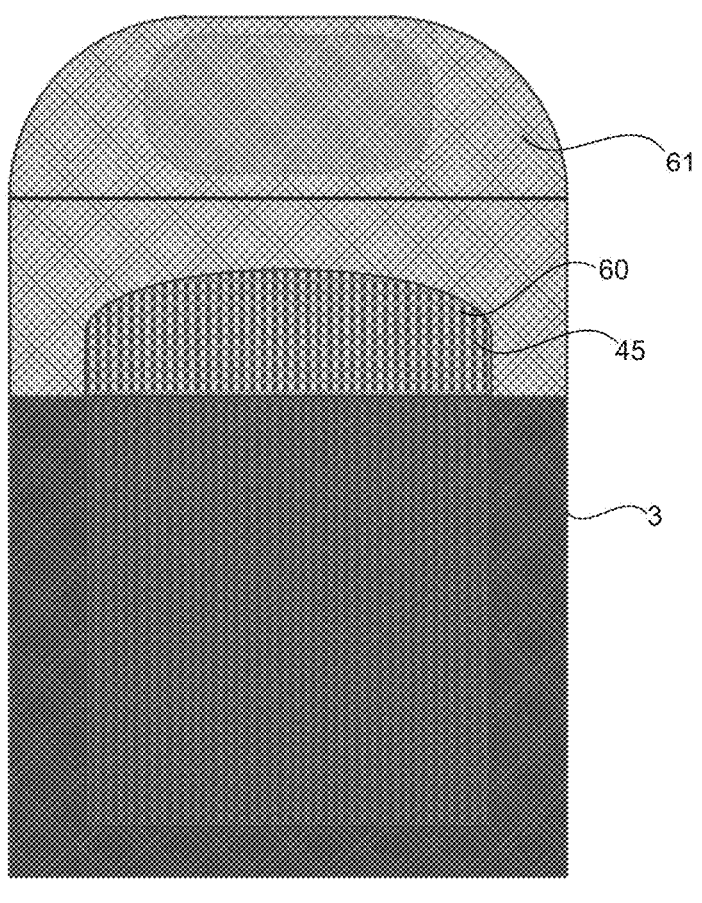
FIG. 8 a possible use of different knitted fabrics, schematically represented
Figures 9A, 9B, 9C:
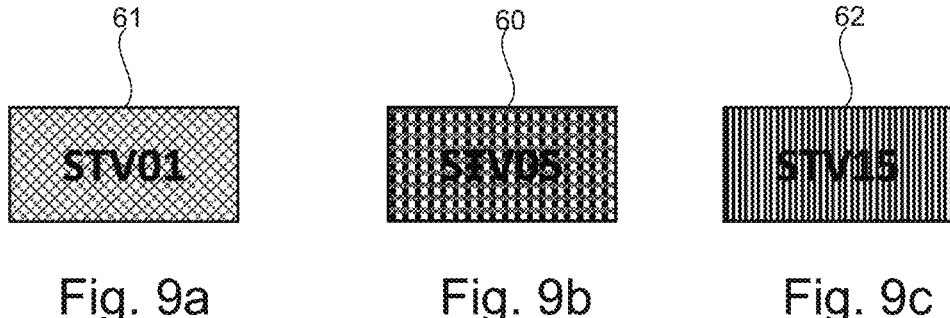
FIGS. 9a-c different knitting patterns.

In FIG. 8 the backrest part 3 is schematically shown in a front view and shows that in different areas different knitted fabrics 5 are represented by different patterns or knitting patterns. In the area of the pocket element 45 when viewed from the front, i.e. facing a person sitting on the seat, a first knitted pattern 60 is shown. In the further area around the pocket element 45, a second knitting pattern 61 is provided. Further, in the rear area of the pocket element 45, a third knitting pattern 62 is provided. The knitting patterns 60, 61, 62 are shown in more detail in further FIGS. 9a, 9b and 9c.

The use of different knitting patterns 60, 61, 62 can be advantageous as they are adapted to the respective field of application. The pocket element 45 is always in contact with the person and should therefore be as abrasion-resistant as possible. In the rear area, increased stretchability is advantageous in order to take into account the force exerted by the person on the knitted fabric 5.

All features disclosed in the application documents are claimed to be essential to the invention if they are new, individually or in combination, compared to the prior art.

LIST OF REFERENCE SIGNS 1 vehicle seat
100 interior decoration
2 seat part
3 backrest part
4 frame element
5 knitted fabric
8 armrest
9 headrest
10 vehicle seat base
11 upper area of the frame element
12 lower area of the frame element
13 inner surface
14a upper side of the upper area
14b cross member of the upper area or fastening element
14c inner side of the cross member of the upper area or
  fastening element
15 first side strut of the lower area
15a inner side of the first side strut
15b outer side of the first side strut
15c front side of the first side strut
15d rear side of the first side strut
16 second side strut of the lower area
16a inner side of the second side strut
16b outer side of the second side strut
16c front side of the second side strut
16d rear side of the second side strut
17 cross member of the lower area
17a inner side of the cross member
17b outer side of the cross member
17c front side of the cross member
17d rear side of the cross member
18 support strut
19 foam insert
20 upper section of knitted fabric
20a first opening side
20b second opening side
21 lower section of the knitted fabric
22 upper fastening unit
22a fastening element
23 first lateral fastening unit
23a fastening element
24 second lateral fastening unit
24a fastening element
25 third lateral fastening unit
25a fastening element
26 fourth lateral fastening unit
26a fastening element
27 lower fastening unit
27a fastening element
28 locking element
29 headrest recess
30a, b seat base connecting element
31a, b seat part connecting element
32 upholstery support element
33 recess
34 opening
35a, b mounting strips
36 upper border area of knitted fabric
37 first lateral border area of the knitted fabric
38 second lateral border area of the knitted fabric
39 lower border area of the knitted fabric
40a, b connecting axis
41 fastening element on the inside of the first side strut
42 fastening element on the inner side of the second side
  strut 43 fastening element on the inner side of the cross
  member
44 headrest fastening
45 pocket element
46 lower segment of upholstery support element
47 middle segment of upholstery support element
48 upper segment of upholstery support element
49 front convex area
50 back convex area
60 first knitting pattern
61 second knitting pattern
62 third knitting pattern
D thickness of the upholstery support element
H height of the upholstery support element
B width of the upholstery support element
V front side of the upholstery support element
R back of the upholstery support element
S1, S2, S3 Cutting axis

What is claimed is:

1. A vehicle seat having a seat part and a backrest part, wherein the backrest part comprises a frame element that encloses an inner surface, and comprises a knitted fabric disposed on the frame element,
  wherein the knitted fabric, at least in the area of the inner surface, is arranged to be free-swinging on the front side of the frame element and, at least in the area of the inner surface, an upholstery support element is arranged in or on the knitted fabric and is held exclusively by the said knitted fabric, wherein the knitted fabric, at least in the area of the inner surface, provides the sole support and/or upholstery for a seat user,
  wherein the upholstery support element is substantially planar and extends substantially parallel to the inner surface and has a uniform thickness or a varying thickness, wherein the upholstery support element comprises a convex lower segment curving forward towards the seat part and/or a convex middle segment curving rearward, wherein the lower segment comprises a uniform thickness across the entire width of the upholstery support element, which narrows upwards, wherein the middle segment comprises a thickness which narrows outwards in relation to the width and the height, wherein the upholstery support element comprises an upper segment with a uniform thickness, and wherein the lower segment of the upholstery support element provides support for a lowest lordosis and the middle segment of the upholstery support element provides support for an upper lordosis.

2. The vehicle seat according to claim 1,
  wherein the upholstery support element is fastened, in particular sewn, to the rear side of the knitted fabric or the knitted fabric is formed as a double-layered knitted fabric at least in the area of the inner surface and has a closable opening on the rear side, so that a pocket element is provided in the knitted fabric, into which the upholstery support element can be introduced via the opening in the knitted fabric, wherein the pocket element being designed to be complementary to the upholstery support element, wherein the opening being reversibly closable by means of a locking element, in particular a thread, a velcro fastener, a zip fastener or snaps.

3. The vehicle seat according to claim 1,
  wherein the frame element has at least one fastening element on at least two opposite inner sides in each case, and the knitted fabric has a fastening element which is formed complementarily thereto and is arranged on the rear side in each case, wherein the knitted fabric being fastened to the frame element by the fastening elements in such a manner that the knitted fabric at least partially embraces the frame element from the outside to the inside starting from a front side of the frame element facing the seat part and is substantially completely stretched.

4. The vehicle seat according to claim 1,
wherein the frame element comprises a continuous upper area for supporting the head and a lower area having the inner surface for supporting the back, wherein one inner side of the upper area limits the inner surface from above and three inner sides of the lower area limits the inner surface laterally and from below, wherein the frame element has at least one fastening element on each of the inner sides limiting the inner surface, wherein the fastening elements on the frame element and the knitted fabric being designed in such a way that the fastening of the knitted fabric to the frame element can be released without being destroyed.

5. The vehicle seat according to claim 1,
wherein the knitted fabric comprises an upper tubular section with two opening sides, a first opening side being closed, the upper tubular section of the knitted fabric being arranged to surround the upper area of the frame element, wherein the knitted fabric comprises a lower section which is essentially flat and directly adjoins the upper section at the front, wherein the lower section contacts the lower area of the frame element from the front and, starting from the front side of the frame element, at least partially embracing it from the outside to the inside.

6. The vehicle seat according to claim 5,
wherein complementary fastening elements of the knitted fabric are arranged on the rear border side at the open second opening side at the upper section and at the lateral border side and at the bottom at the lower section.

7. The vehicle seat according to claim 1,
wherein a lower section of the knitted fabric, on or in which the upholstery support element is arranged, is convex at least in the area of the inner surface towards the front in the direction of the seat part, so that a front convex area is formed which, from the front, gives the appearance of an attached cushion.

8. The vehicle seat according to claim 1,
wherein at least two, in particular at least four, fastening units are fixedly arranged on the knitted fabric, wherein the fastening units have fastening elements arranged on the knitted fabric and each fastening unit comprising at least one fastening element, wherein the fastening units are fastened, in particular sewn on, to the knitted fabric on the border side, in particular opposite one another, and being designed in a strip-like manner, the fastening elements arranged on the fastening units projecting beyond a base surface of the knitted fabric.

9. A method of interior decoration of a means of transport, in particular a means of passenger transport, comprising at least one vehicle seat according to claim 1.

* * * * *